United States Patent [19]

Kachnowski et al.

[11] Patent Number: 4,761,975
[45] Date of Patent: Aug. 9, 1988

[54] MODULE SECURITY LOCKING DEVICE

[75] Inventors: Thomas A. Kachnowski, Flemington; Frederick E. Bratro, Manville; Elhanan Kaplan, East Brunswick; George A. Sudol, Kenvil, all of N.J.

[73] Assignee: Unisys Corporation, Blue Bell, Pa.

[21] Appl. No.: 58,717

[22] Filed: Jun. 5, 1987

[51] Int. Cl.$^4$ ............................................. F16B 41/00
[52] U.S. Cl. ............................... 70/232; 70/DIG. 57
[58] Field of Search ................ 70/229, 232, DIG. 57, 70/DIG. 58, 230

[56] References Cited

U.S. PATENT DOCUMENTS

| 3,996,774 | 12/1976 | Best | 70/32 |
| 4,005,253 | 1/1977 | Walter | 70/DIG. 57 |
| 4,094,173 | 6/1978 | Brown | 70/232 |

Primary Examiner—Robert L. Wolfe
Attorney, Agent, or Firm—Albert B. Cooper; Laurence J. Marhoefer

[57] ABSTRACT

Apparatus for locking together modules of a computer system includes first and second members that are secured, by screws, proximate adjacent edges of adjacent modules. Tabs on the members and holes through the tabs align so that a padlock may be utilized to lock the modules together. A slotted plate is positioned on the tabs and secured in place by the padlock to cover the securing screws so that they cannot be removed.

2 Claims, 3 Drawing Sheets

MODULE SECURITY LOCKING DEVICE

BACKGROUND OF THE INVENTION

1. Field of the Invention

The invention relates to modular computer systems, particularly with respect to devices for locking the modules thereof together.

2. Description of the Prior Art

Present day computer systems, such as office work stations, personal computers and mini computers, are often comprised of modular units which are coupled together to form the entire system. For example, a CPU module, disc drive modules, and communication modules may be coupled together to form a system configured by the purchaser in accordance with the requirements thereof. Generally, the modules are equipped with mating coupling mechanisms for coupling the selected modules together to form the particular computer system desired.

The coupling mechanisms are designed so that a module may be readily uncoupled and removed. As a result, portions of an assembled computer system may be uncoupled and removed to another location on a temporary or permanent basis. For the user who desires to maintain the computer system in the configuration in which it was assembled, the removal of portions thereof may result in considerable inconvenience.

A lock for securing modules is disclosed in U.S. Pat. No. 4,648,737, issued Mar. 10, 1987 entitled "Theft Prevention Apparatus". The locking mechanism of said U.S. Pat. No. 4,648,737 is designed to secure modules having a coupling mechanism actuatable by a handle projecting toward the rear of the module. Brackets are inserted into apertures in the rear of adjacent modules. A padlock locked through both brackets prevents the handle of the coupling mechanism from being actuated so as to decouple the modules. Such an arrangement would be unusable with modules having coupling mechanisms actuated by means that are not readily secured. With such coupling mechanisms, undesirable machining such as drilling and tapping holes may be required to appropriately secure a locking mechanism.

Hinged hasps are available for locking two assemblies together with a padlock. Hinged hasps are complex to machine and assemble and would invariabley require the drilling and tapping of holes into the modules to secure the hasp thereto.

It is desireable that the security locking mechanism be simple and inexpensive and installable at the rear of the modules so as to avoid an adverse impact on the appearance of the assembled computer system. The device should also be universally useable independently of the type of coupling mechanism incorporated with the modules.

SUMMARY OF THE INVENTION

The apparatus of the present invention is utilized for locking a first assembly to a second assembly, where the assemblies are preferably computer system modules, and where each assembly has a threaded screw hole proximate to an edge thereof. When the system is assembled, the first assembly is adjacent to the second assembly whereby the edges having the proximate screw holes are also adjacent. The apparatus includes first and second members, each having a plate with a screw clearance hole therethrough and a tab secured and orthogonal to the plate. Each tab has a hole therethrough to receive the shackle of a padlock. In use, the members are screwed to the respective assemblies via the screw clearance holes with the tabs superposed with respect to each other and the holes therethrough aligned to receive the shackle of the padlock. A further plate is included having a slot through which the superposed tabs are passed such that the further plate is secured from removal by the shackle of the padlock inserted through the holes in the tabs. The further plate is of such length and width so as to cover the screw clearance holes in the members. The tabs, the slot and the further plate are so dimensioned that when the further plate is secured on the tabs by the shackle, no motion of the further plate can occur that will permit access to the screw clearance holes in the members. Preferably, for economical manufacture and simplicity of installation, the first and second members are constructed identically with respect to each other.

DESCRIPTION OF THE PREFERRED EMBODIMENT

Figure 1:
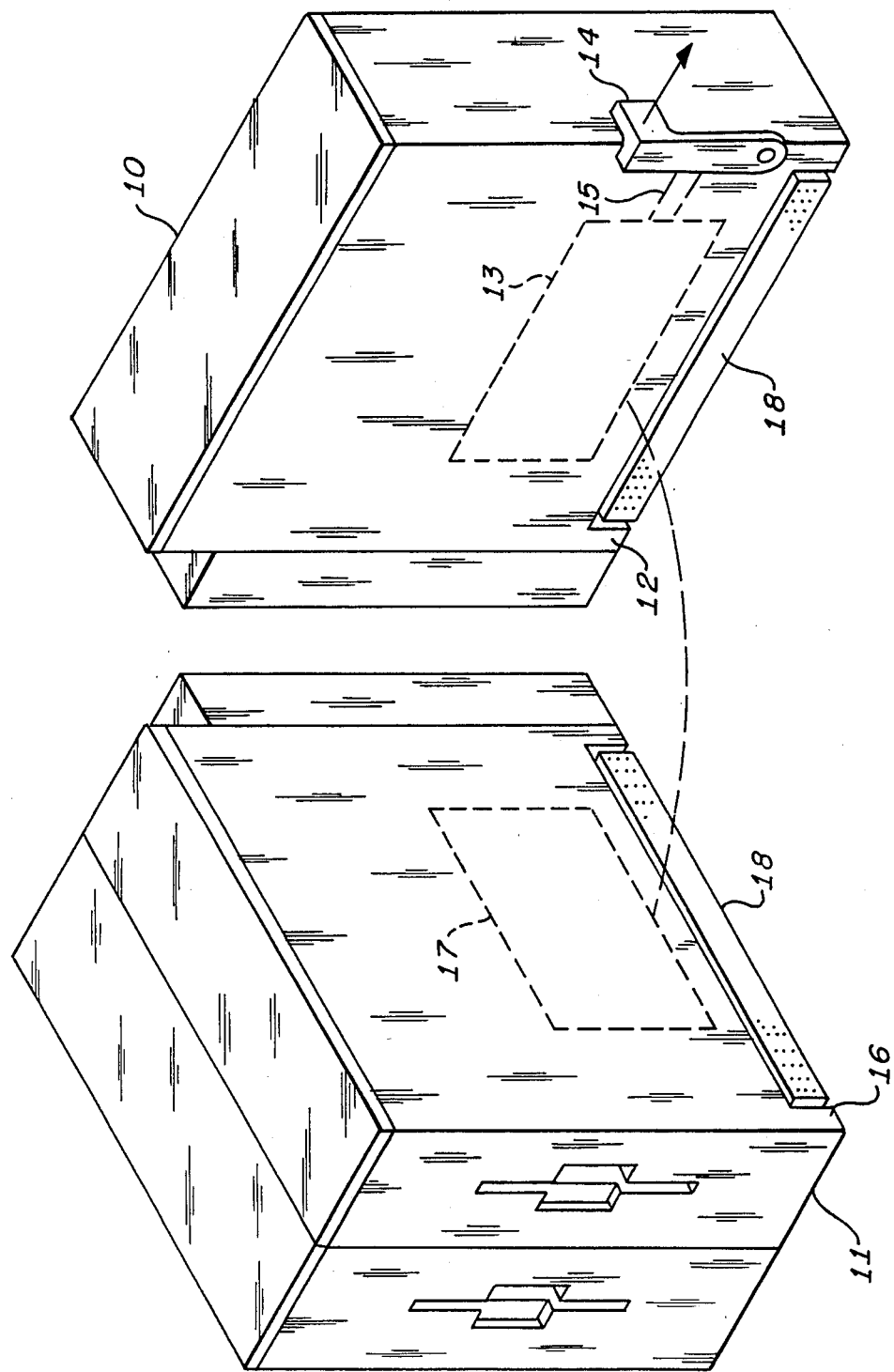
FIG. 1 is a perspective view of modules of a computer system with which the invention is utilized.

The principles of the invention can be utilized to lock together substantially any two assemblies or housings for electronic or other apparatus. For purposes of illustration, the invention is described in terms of locking together a disc drive assembly module and a central processing unit module (CPU) of a work station computer system. Referring to FIG. 1, a CPU module 10 and a disc drive module 11 are illustrated in a position preparatory to being coupled together. A side wall 12 of the module 10 is equipped with a portion 13 of a module coupling mechanism as schematically illustrated. A lever 14 is mounted on the wall 12 and connected by an element schematically represented at 15 to actuate the mechanism.

The module 11 has a side wall 16 equipped with another portion 17 of the coupling mechanism as schematically illustrated. With the lever 14 pulled forwardly in the direction of the arrow and the module 10 placed adjacent the module 11, the mechanisms 13 and 17 are positioned to effect coupling. When the lever 14 is pressed rearwardly in the direction opposite the arrow, the coupling mechanism 13, 17 become tightly engaged thereby coupling the modules 10 and 11 together. The system bus connection for the assembled computer system is effected by electrical connectors 18.

Figure 2:
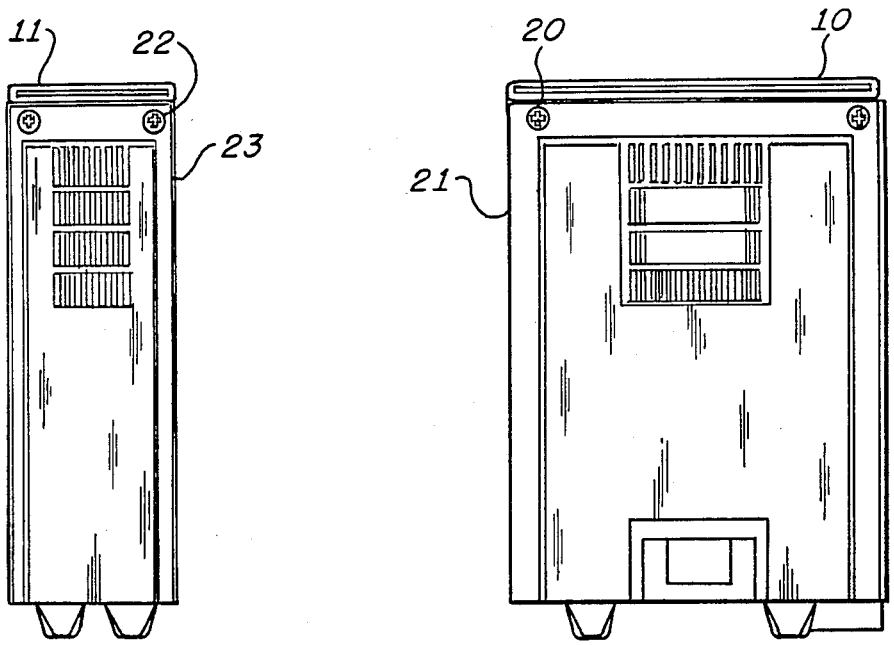
FIG. 2 is a rear elevation view of two of the modules of FIG. 1.

Referring to FIG. 2, in which like reference numerals indicate like components with respect to FIG. 1, the back ends of the modules 10 and 11 are illustrated. The module 10 has a screw 20 utilized in construction thereof. The screw 20 is adjacent an edge 21 of the module. In a similar manner, the module 11 has a screw 22 adjacent an edge 23. When the modules 10 and 11 are coupled together in the manner described with respect to FIG. 1, the edges 21 and 23 become positioned adjacent with respect to each other.

Figure 3:
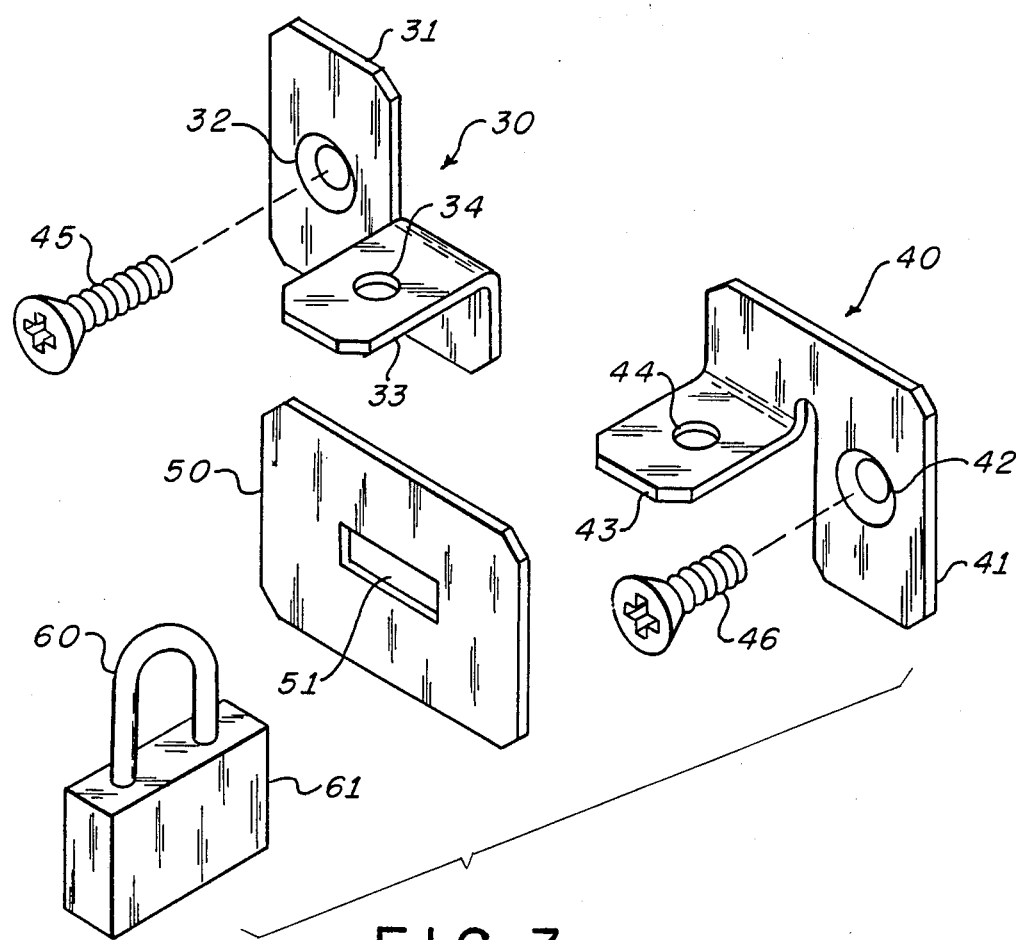
FIG. 3 is an exploded perspective view of the components comprising the locking apparatus of the present invention.
Figures 6A, 6B:
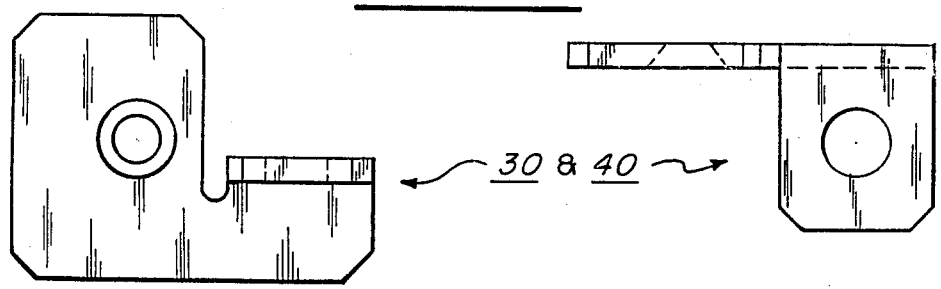
FIGS. 6A, 6B, 7A and 7B are scale drawings showing elevation and plan views of the components of FIG. 3.
Figures 7A, 7B:
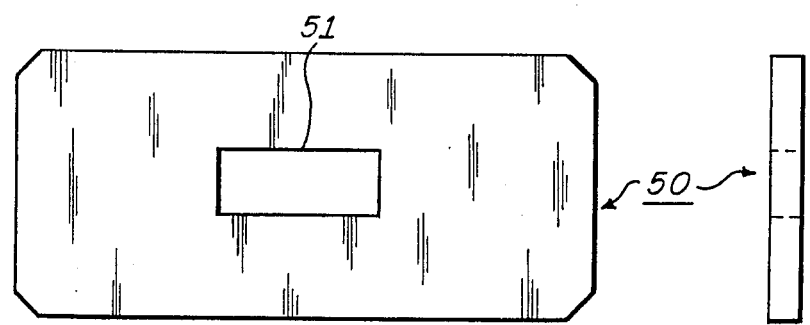

Referring to FIG. 3, the components of the locking apparatus of the present invention are illustrated in exploded view. A first member 30 includes a plate 31 with a screw clearance hole 32 therethrough. The screw clearance hole 32 has a diameter to provide clearance for the screw 22 of the module 11. The screw clearance hole 32 may be counter sunk to accomodate a flat head screw. The member 30 further includes a tab 33 secured to the plate 31 and orthogonal thereto. The tab has a hole 34 therethrough of sufficient diameter to accept the shackle of a padlock. It is appreciated that the plate 31 and the tab 33 may be stamped and formed from a unitary piece of metal.

In a similar manner, the apparatus includes a second member 40 with a plate 41, a screw clearance hole 42, a tab 43 and a hole 44.

In use, the member 30 is secured to the module 11 at the screw 22 and the member 40 is secured to the module 10 at the screw 20. It is appreciated that the screws 20 and 22 may be utilized to secure the members 40 and 30 to the respective modules or alternatively longer screws may be utilized for this purpose. Screws 45 and 46 are illustrated in FIG. 3 for performing this function.

With the members 30 and 40 secured to the modules 11 and 10, respectively, and the modules 10 and 11 coupled together in the manner described with respect to FIG. 1, the tabs 33 and 43 will be superposed with respect to each other with the holes 33 and 34 aligned with respect to each other.

A plate 50 with a slot 51 therethrough is included in the apparatus of the present invention. The slot 51 is dimensioned to permit the superposed tabs 33 and 43 to pass therethrough. The plate 50 is dimensioned such that with the slot 51 slid over the tabs 33 and 43, the screw clearance holes 32 and 42 will be covered. In use, with the members 30 and 40 secured to the modules 11 and 10 as described above and with the plate 50 slid over the tabs 33 and 43, the shackle 60 of a padlock 61 is inserted through the holes 34 and 44 and the padlock 61 locked to secure the modules together. The dimensions and size of the plate 50, the size of the slot 51, the shape of the tabs 33 and 34 and the position of the holes 34 and 44 are such that with the padlock 61 in place, the plate 50 cannot be rotated or translated to expose the securing screws 45 and 46.

It is appreciated that the members 30 and 40 are identical with respect to each other. The member 30 is secured to the module 11 with the tab 33 to the right of the clearance hole 32. The member 40 is secured to the module 10 with the tab 43 to the left of the clearance hole 42. With this arrangement, the tabs 33 and 43 are vertically offset with respect to each other so that when the modules 10 and 11 are coupled together, the tab 43 is superposed with respect to the tab 33 with the holes 34 and 44 aligned with respect to each other. Since the members 30 and 40 are identical with respect to each other, manufacturing and installation are simplified since only one part need be stocked.

Figure 4:
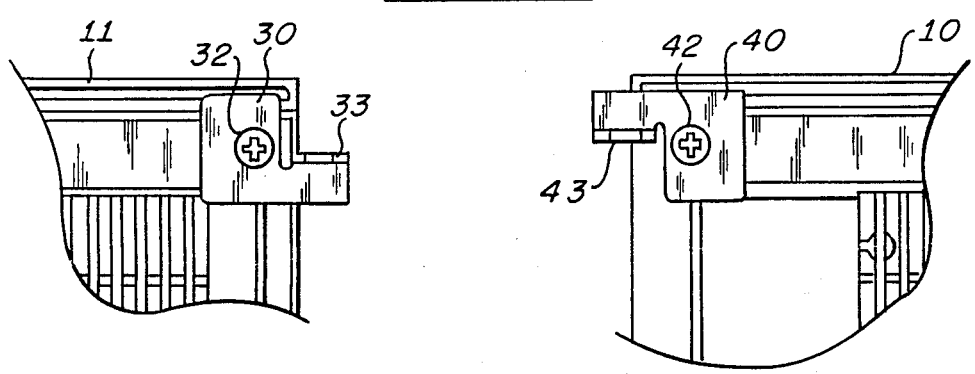
FIG. 4 is an enlarged view of a portion of FIG. 2 with two of the members of the locking apparatus secured thereto.
Figure 5:
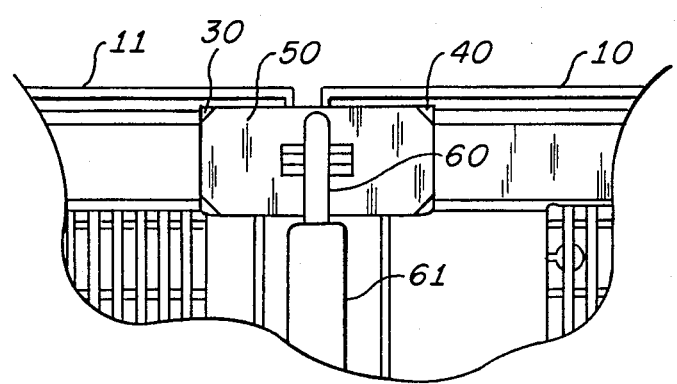
FIG. 5 is a view similar to that of FIG. 4 with the modules locked together utilizing the apparatus of the present invention.

Referring to FIGS. 4 and 5, in which like reference numerals indicate like components with respect to FIGS. 1-3, a portion of the back end of the modules 10 and 11 with the members 40 and 30 secured thereto is illustrated. In FIG. 4, the modules 10 and 11 are separated from each other. In FIG. 5 the modules 10 and 11 are coupled together with the tabs 33 and 43 superposed with respect to each other, with the plate 50 positioned around the tabs 33 and 43 and with the shackle 60 of the padlock 61 inserted through the holes 34 and 44 to lock the modules 10 and 11 together.

FIGS. 6A and 6B and FIGS. 7A and 7B illustrate two views of the members 30 and 40 and of the plate 50, respectively. FIGS. 6A, 6B, 7A and 7B are scale drawings of the parts.

Although the herein described embodiment of the invention was explained in terms of the tabs 33 and 43 being horizontally disposed, it is appreciated that the invention may also be practiced with vertically disposed tabs similar to those illustrated in said U.S. Pat. No. 4,648,737. With such vertically disposed tabs the slot 51 in the plate 50 would also be vertically oriented.

It is appreciated from the foregoing that the apparatus of the present invention provides a simple and economical security lock for computer system modules. The locking apparatus is adaptable to existing screw holes on the modules so that customers are not required to perform any machining in installing the device. A simple installation operation is utilized employing the existing module screws or longer screws to accommodate the thickness of the mounting plates.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for locking a first assembly to a second assembly adjacent thereto, each said assembly hvaing a threaded screw hole therein proximate an edge thereof, said edge of said first assembly being adjacent said edge of said assembly, said locking being effected by a padlock having a shackle, said apparatus comprising a first member having a first plate with a first screw clearance hole therethrough and a first tab secured and orthogonal to said first plate, said first tab having a first hole therethrough adapted to receive said shackle, a second member having a second plate with a second screw clearance hole therethrough and a second tab secured and orthogonal to said second plate, said second tab having a second hole therethrough adapted to receive said shackle, and a further plate, separate from said padlock having a slot therein, said first plate being secured, in use, to said first assembly by a screw passing through said first screw clearance hole and secured in said threaded screw hole of said first assembly, said second plate being secured, in use, to said second assembly by a screw passing through said second screw clearance hole and secured in said threaded screw hole of said second assembly, said first and second tabs being superposed, in use, so that said first and second holes are aligned with respect to each other, said slot being of such length and width to permit said superposed tabs to pass therethrough, said further plate, in use, being positioned on said superposed tabs and being of such length and width to cover said first and second screw clearance holes, said further plate being secured, in use, from removal by said shackle inserted through said first and second holes, said tabs, said slot and said further plate being dimensioned so that when said further plate is secured said tabs by said shackle, no motion of said further plate can occur that will permit access to either said first or said second screw clearance hole.

2. The apparatus of claim 1 wherein said first and second members are identical with respect to each other.

* * * * *